Feb. 17, 1931.  F. S. HUDSON  1,793,091
WHEEL DRIVE FOR MOTOR VEHICLES
Filed April 9, 1927

Witness:
R E Hamilton

Inventor,
Finn S. Hudson
By Warren D. House,
His Attorney.

Patented Feb. 17, 1931

1,793,091

UNITED STATES PATENT OFFICE

FINN S. HUDSON, OF KANSAS CITY, MISSOURI

WHEEL DRIVE FOR MOTOR VEHICLES

Application filed April 9, 1927. Serial No. 182,338.

My invention relates to improvements in wheel drives for motor vehicles. It is applicable to either a front or rear wheel drive.

One of the objects of my invention is to provide a novel wheel drive of the kind described, which is simple, strong, compact, durable, not liable to get out of order, which is easy to steer, can be readily and efficiently lubricated, and which is efficient in operation and may be readily applied to motor vehicles of types now in use.

The novel features of my invention are hereinafter fully described and claimed.

Figure 1:
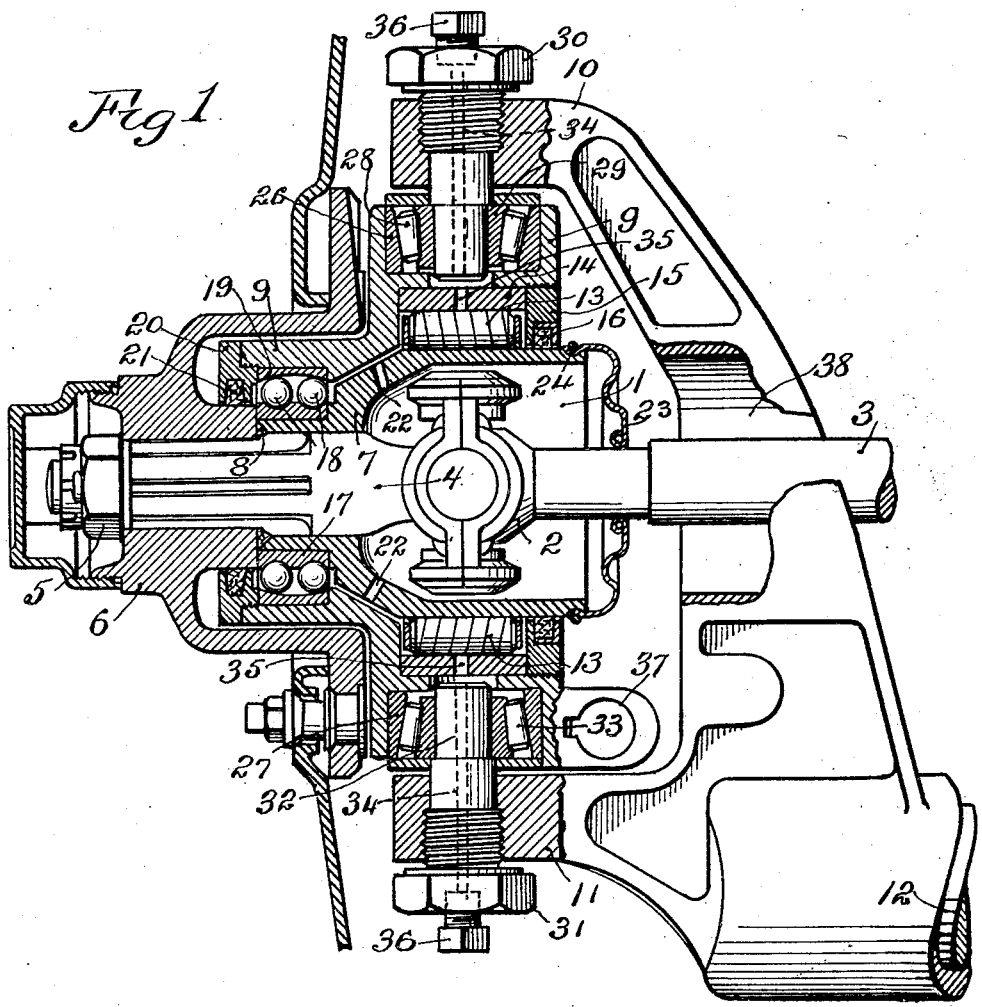

In the accompanying drawing, which illustrates the preferred embodiment of my invention, Fig. 1 is a view partly in elevation, and partly in central longitudinal vertical section of my improved drive, shown applied to a wheel and axle, portions only of which are shown.

Figure 2:
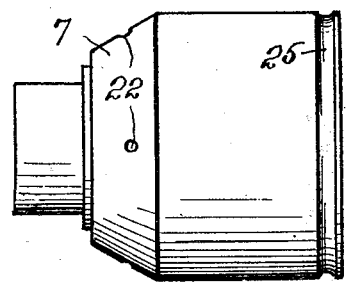

Fig. 2 is a side elevation of the hollow member of the spindle.

Similar reference characters designate similar parts in the different views.

The spindle preferably comprises one having in its inner end a recess 1 in which is located a universal joint 2, of usual type having its axes intersecting at right angles, and provided with a rigid connection with a drive shaft 3, and rigidly connected to a solid portion 4 of the spindle having at its outer end a nut 5 which bears against the outer end of a wheel hub 6, of usual type and having a splined connection with the spindle portion 4 on which it is removably mounted.

The spindle is provided with a tubular member 7 having a reduced outer end, which embraces and is rigidly fastened to the spindle member 4, in any suitable manner, as by welding material 8. The spindle member 7 provides the recess 1 in which the universal joint 2 is located. The spindle member 7 is rotatable in and is spaced apart from a ring 9 which serves as a bearing and which is oscillatively mounted between two arms 10 and 11, disposed one above the other, and which form part of the adjacent end of an axle 12.

Bearing means between the tubular member 7 and the bearing ring 9 are provided, and comprise, preferably, the following described parts.

A series of longitudinally disposed bearing rollers 13 are mounted and are adapted for travel upon the enlarged cylindrical end portion of the spindle member 7, and are disposed within and adapted to have traveling contact with a bearing ring 14, which is fitted in the inner end portion of the bearing ring 9, in which it is retained by a removable ring 15, which is externally threaded, and is fitted in a threaded hole in the inner side of the bearing ring 9. Packing 16 is mounted in the ring 15, and bears on the periphery of the spindle member 7.

The outer end of the spindle member 7 has fitted on it a bearing ring 17 having two annular grooves in which are respectively mounted two series of balls 18, which are adapted for travel in a bearing ring 19, which is mounted in the outer side of the bearing ring 9. The balls 18 are adapted to withstand end thrust and also serve, as do the rollers 13, to carry the load. As shown in Fig. 1, the bearing rollers 13 and cage in which they are mounted are adapted for free movement longitudinally on the spindle member 7, and, as the thrust rollers 18 hold the ring 9 from endwise movement in either direction, the rollers 13 serve only as load carrying means, which, as they are not subjected to end thrust, effect their functions with a minimum of friction. As the rollers 13 are intersected by the plane which intersects at right angles the horizontal axis of the ring 9 and is disposed coincidental with the vertical axis of the ring, the load will not exert a prying effect on the spindle or on the driving shaft 3.

The hub 6 bears against the outer end of the bearing ring 17, and an externally threaded ring 20, fitted in a threaded hole in the outer side of the bearing ring 9, bears against the outer end of the bearing ring 19.

The ring 20 has fitted in it packing 21, which bears on the periphery of the hub 6.

The spindle member 7 is provided with radial passages 22 through which grease or other lubricant can enter the member 7 from the annular space between the member 7 and the bearing ring 9.

The inner end of the spindle member 7 may be closed by a flexible cap, of leather, or soft rubber, which is designated by 23 and which embraces the inner portion of the universal joint 2. A spring split ring 24 embraces the periphery of the cap 23 and removably holds it in an annular peripheral groove 25 in the member 7, Fig. 2.

The cap 23 keeps out dirt and dust and holds in the member 7, the lubricant entering therein.

The bearing ring 9 is oscillative between the arms 10 and 11 of the axle, and has its axis in alinement with the point of intersection of the axes of the universal joint 2. For oscillatively supporting the bearing ring 9, the following described parts may be employed.

Diametrically opposite upper and lower bearing rings 26 and 27 are respectively mounted in two recesses provided therefor in the upper and lower sides of the bearing ring 9. Adapted for travel in and against the ring 26 are downwardly tapering bearing rollers 28, the axes of which converge downwardly, said rollers 28 being adapted for travel on and engaging the periphery of an inner bearing ring 29, which is mounted on the lower end portion of a pivot pin 30, which is rotatable in and has threaded engagement with the arm 10.

The axis of the pivot pin 30 alines with the point of intersection of the axes of the universal joint 2. By adjustment vertically of the pin 30, the bearing rollers 28 may be adjusted upwardly and downwardly.

A similar pivot pin 31, which is in alinement with the pin 30, is mounted in and has threaded engagement with the axle arm 11. It has mounted on it an inner bearing ring 32 having a periphery which converges upwardly and upon which are adapted to travel bearing rollers 33 which converge upwardly on their outer surfaces and with respect to each other. The rollers 33 are located in and are adapted for travel against the bearing ring 27. By adjustment of the pivot pin 31 in the axle arm 11, the rollers 33 may be vertically adjusted. As shown in Fig. 1, the pivot pins 30 and 31 are disposed at their innermost positions. By turning them so as to withdraw them slightly outwardly, the rollers 33 and 28 will have greater freedom of movement, and by adjustment inwardly or outwardly of the pivot pins 30 and 31, the adjustment may be varied to suit the pressure desired or to compensate for wear.

Each of the pivot pins 30 and 31 is provided therethrough with a central longitudinal hole 34 through which lubricating material may be forced against the periphery of the bearing ring 14, which is provided with radial holes 35, through which the lubricant may pass into the space between the bearing ring 9 and the spindle member 7, and thereby furnish lubricant to the rollers 13 and balls 18, as well as to the rollers 28 and 33.

The outer ends of the pivot pins 30 and 31 are internally threaded and have respectively fitted therein ordinary grease cup fittings 36 through which the lubricant may be inserted into the longitudinal holes 34 of the pivot pins.

The bearing ring 9 is provided adjacent to its lower end with a transverse hole 37, which is adapted to receive a steering member, not shown, by which the bearing ring 9 may be oscillated on the pivot pins 30 and 31 in the operation of steering.

The axle arm 10 is provided with a transverse opening 38 through which extends the drive shaft 3.

In the operation of the invention, when the drive shaft 3 is rotated, such rotation will be transmitted through the universal joint 2 to the spindle members 4 and 7, thereby revolving the hub 6.

When the bearings containing the rollers 28 and 33 become worn by use, looseness in these bearings may be eliminated by the proper vertical adjustment of the pivot pins 30 and 31 toward each other, the tapering form and opposite convergence of the upper and lower set of rollers, with respect to each other, effecting the desired tightening of the bearings.

I do not limit my invention to the structure shown and described, as many modifications, within the scope of the appended claims, may be made without departing from the spirit of my invention.

What I claim is:

1. In a vehicle wheel drive having an axle, a rotary spindle, an oscillatory bearing ring the axis of which intersects at right angles the axis of said spindle, bearing means intermediate of and engaging said ring and said spindle, and two alined pivot pins mounted in said axle and adjustable longitudinally toward and from each other with their axes coincidental with the axis of said ring, a pair of bearing rings mounted in said ring and respectively concentrically encircling said pivot pins, a pair of inner bearing rings respectively within said first pair of bearing rings and respectively mounted on and movable longitudinally with said pivot pins, each of said pairs of bearing rings having their bearing surfaces converging oppositely, and two sets of tapering bearing rollers mounted respectively between and engaging the bearing surfaces of said two pairs of bearing rings, whereby longitudinal adjustment of said pivot pins will longitudinally move said inner bearing rings and effect thereby a tightening or loosening of said tapering bearing rollers with respect to said two pairs of bearing rings.

2. In a vehicle wheel having an axle, a rotary spindle, two alined pivot pins carried by said axle at opposite sides respectively of said spindle and disposed radially with respect to the axis of said spindle, a bearing ring oscillatively mounted on said pivot pins and concentrically encircling said spindle, bearing rollers between and engaging said ring and said spindle and movable endwise to and extending through the plane which centrally longitudinally divides said pivot pins at right angles to said spindle and which coincides with the axis of said ring, and thrust means engaging said ring and said spindle for holding them from relative movement parallel with each other.

In testimony whereof I have signed my name to this specification.

FINN S. HUDSON.